(12) United States Patent
Lueschow

(10) Patent No.: US 7,082,375 B2
(45) Date of Patent: Jul. 25, 2006

(54) SYSTEM FOR DETECTING AN INCORRECT PAYLOAD LIFT

(75) Inventor: Kevin J. Lueschow, Elmwood, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/950,499

(22) Filed: Sep. 28, 2004

(65) Prior Publication Data

US 2006/0074578 A1 Apr. 6, 2006

(51) Int. Cl.
*G01G 23/01* (2006.01)

(52) U.S. Cl. ...................................... 702/101
(58) Field of Classification Search ................ 177/141, 177/25.13; 702/101
See application file for complete search history.

(56) References Cited

U.S. PATENT DOCUMENTS 5,105,896 A * 4/1992 Kyrtsos ...................... 177/139
6,552,279 B1 4/2003 Lueschow et al.

* cited by examiner

*Primary Examiner*—John Barlow
*Assistant Examiner*—Cindy D. Khuu
(74) *Attorney, Agent, or Firm*—Finnegan, Henderson, Farabow, Garrett & Dunner

(57) ABSTRACT

A system for validating a payload weight measurement for a machine includes a pressure sensor configured to generate a pressure signal indicative of an actuating fluid pressure associated with a fluid cylinder operatively coupled to a work implement of the machine. An extension sensor is configured to generate an extension signal indicative of an extension of the fluid cylinder. The system also includes a controller configured to monitor the pressure signal and the extension signal to determine a plurality of actuating fluid pressure values and corresponding extension values associated with the fluid cylinder while lifting a payload of unknown weight with the work implement. The controller is also configured to compare the plurality of actuating fluid pressure values and the corresponding extension values to at least one predetermined pressure versus extension curve and to determine whether an accurate weight value may be assigned to the payload based on the comparison of the plurality of actuating fluid pressure values and the corresponding extension values to the at least one predetermined pressure versus extension curve.

28 Claims, 4 Drawing Sheets

US 7,082,375 B2

SYSTEM FOR DETECTING AN INCORRECT PAYLOAD LIFT

TECHNICAL FIELD

The present disclosure relates to systems and methods for measuring a payload weight for a work machine, and more particularly, to systems and methods for determining whether an accurate weight value may be assigned to a particular payload lift.

BACKGROUND

Various types of work machines may be used to transfer bulk material from a work site stockpile and load this material onto transport machines, such as trucks and railroad cars. In many situations, each transport machine may have a particular maximum load capacity determined by a manufacturer's maximum load rating and/or other factors such as, for example, weight restrictions for on-highway vehicles. To promote maximum utilization of the transport machines, it may be desirable to load each transport machine as close as possible to its maximum load capacity. Overloading the transport machines, however, may have negative consequences. Particularly, placing too much weight on a transport machine can significantly increase maintenance costs for the machine. Further, in certain situations, especially to comply with weight restriction regulations, it may be necessary to remove material from an overloaded machine. The extra steps necessary to remove the material can cause costly delays in both the loading and transport processes. Thus, there is a need for systems that accurately and automatically determine the payload weight of a loading machine to ensure that neither too much nor too little material is loaded on a transport machine.

At least one system has been developed for determining the payload weight of a loading machine. U.S. Pat. No. 6,552,279 ("the '279 patent") issued to Lueschow et al. on Apr. 22, 2003, describes a system for monitoring characteristics associated with a hydraulic cylinder involved in lifting a payload to determine the weight of the payload. Particularly, the system of the '279 patent establishes a first lift curve, including fluid pressure plotted versus extension data for the hydraulic cylinder, by lifting a work implement with no payload. The system then establishes a second lift curve by lifting the work implement filled with a known weight. After this calibration process, the system of the '279 patent can accurately estimate an unknown payload weight by monitoring a third pressure versus extension curve for the unknown payload weight and interpolating or extrapolating a weight value by comparing the third curve to the first and second curves.

The system of the '279 patent can provide accurate payload weight measurements. Nevertheless, the system of the '279 patent may have certain limitations. Particularly, the system of the '279 patent assumes that during the lift of the unknown payload weight, the work implement (e.g., a bucket of a wheel loader or other type of machine) is maintained in an orientation similar to the orientation used during the calibration process. For example, to generate the first and second pressure versus extension curves during the calibration process, the operator may place the work implement in a fully racked back position. If, during the lift of the unknown payload weight, the operator does not maintain the work implement in a similar fully racked position, the resulting payload weight calculation may be inaccurate. This inaccuracy may be due, at least in part, to the center of gravity of the work implement traveling along a different path when lifting the unknown payload weight as compared to the lifts of the known payload amounts.

Other inaccuracies in the payload weight determination may result if an operator fails to perform a suitable calibration process. Specifically, attempting to calibrate the system of the '279 patent on relatively uneven ground where the machine is pitched forward or backward may affect the accuracy of subsequent payload weight measurements. Further, changing the relative work the payload weight measurement.

The present disclosure improves upon the prior art systems for weighing payloads.

SUMMARY OF THE INVENTION

One disclosed embodiment includes a system for validating a payload weight measurement for a machine. The system includes a pressure sensor configured to generate a pressure signal indicative of an actuating fluid pressure associated with a fluid cylinder operatively coupled to a work implement of the machine. An extension sensor is configured to generate an extension signal indicative of an extension of the fluid cylinder. The system also includes a controller configured to monitor the pressure signal and the extension signal to determine a plurality of actuating fluid pressure values and corresponding extension values associated with the fluid cylinder while lifting a payload of unknown weight with the work implement. The controller is also configured to compare the plurality of actuating fluid pressure values and the corresponding extension values to at least one predetermined pressure versus extension curve and to determine whether an accurate weight value may be assigned to the payload based on the comparison of the plurality of actuating fluid pressure values and the corresponding extension values to the at least one predetermined pressure versus extension curve.

Another disclosed embodiment includes a work machine having a work implement and at least one fluid cylinder operatively connected to the work implement. A pressure sensor may be configured to generate a pressure signal indicative of an actuating fluid pressure associated with the at least one fluid cylinder. An extension sensor may be configured to generate an extension signal indicative of an extension of the at least one fluid cylinder. A controller is included and configured to determine a plurality of actuating fluid pressure values and corresponding extension values associated with the at least one fluid cylinder while lifting a payload of unknown weight with the work implement. The controller may also be configured to compare the plurality of actuating fluid pressure values and the corresponding extension values to at least one predetermined pressure versus extension curve and to determine whether an accurate weight value may be assigned to the payload based on the comparison of the plurality of actuating fluid pressure values and the corresponding extension values to the at least one predetermined pressure versus extension curve.

Another disclosed embodiment includes a method of characterizing a payload lift for a machine. The method may include lifting a payload of unknown weight using a work implement associated with the machine and determining a plurality of actuating fluid pressure values and corresponding extension values associated with a fluid cylinder operatively connected to the work implement. The plurality of actuating fluid pressure values and the corresponding extension values may be compared to at least one predetermined pressure versus extension curve, and a determination may be made regarding whether an accurate weight value may be assigned to the payload based on the comparison of the plurality of actuating fluid pressure values and the corresponding extension values to the at least one predetermined pressure versus extension curve.

DETAILED DESCRIPTION

Figure 1:
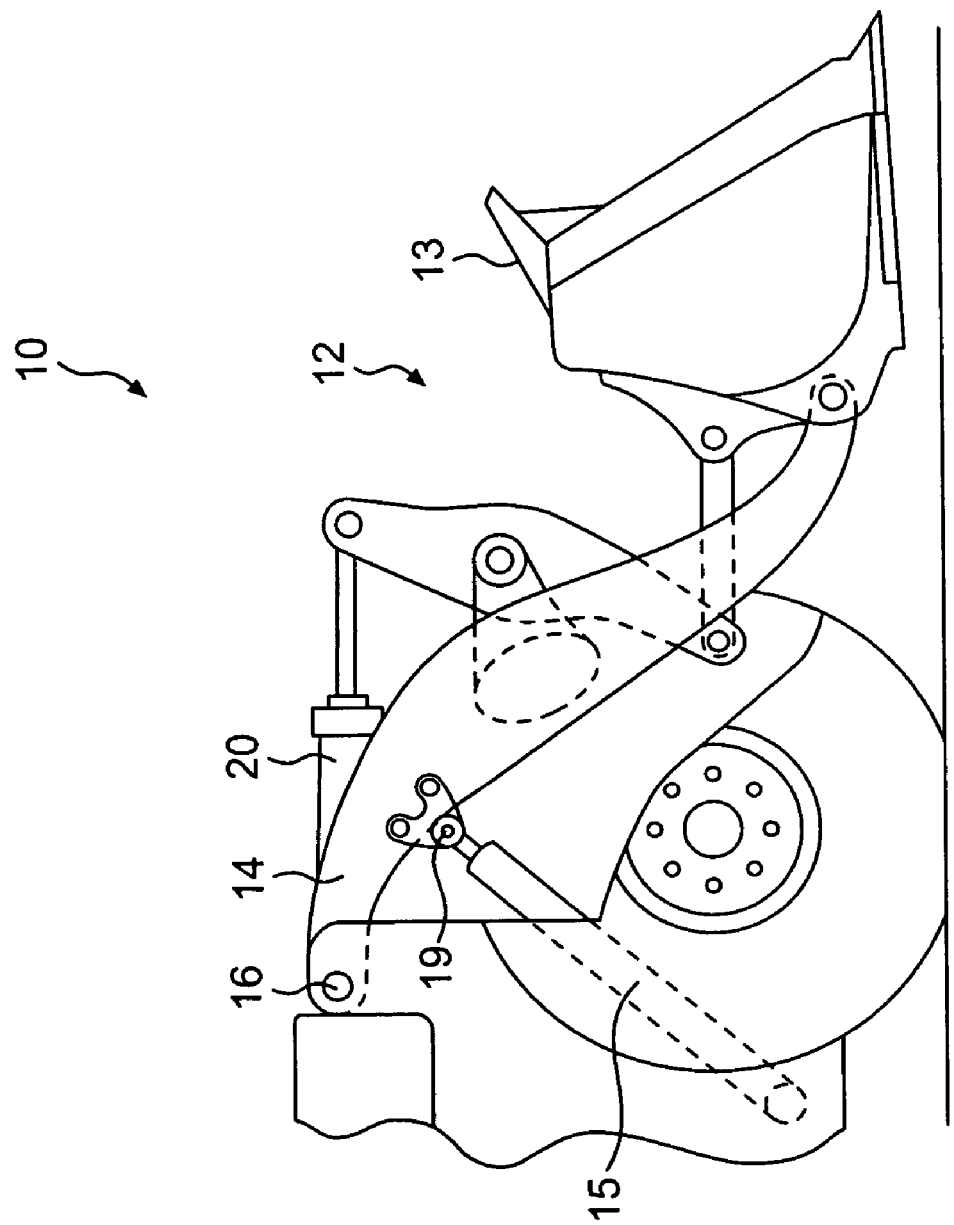
FIG. 1 provides a partial side-view pictorial representation of a work machine according to an exemplary disclosed embodiment.

FIG. 1 provides a partial side-view representation of a work machine 10 according to an exemplary disclosed embodiment. While work machine 10 is shown as a wheel loader, work machine 10 may include any type of machine capable of lifting, supporting, or otherwise operating on a payload. For example, work machine 10 may include a track type tractor, a dump truck, a wheeled tractor, a shovel/loader, a backhoe, or any other suitable machine.

Work machine 10 may include a work implement 12 capable of supporting and/or lifting a payload. In one embodiment, work implement 12 may include a bucket 13 for use with a wheel loader, for example.

Work machine 10 may include at least one fluid cylinder (e.g., hydraulic or pneumatic) operatively connected to work implement 12 for manipulating work implement 12. In one embodiment, bucket 13 may be connected to a lift arm assembly 14, which is pivotally actuated by two hydraulic lift cylinders 15 (only one of which is shown). Lift arm assembly 12 may pivot about a pair of lift arm pivot pins 16 (only one of which is shown) attached to the frame of work machine 10. Each lift cylinder 15 may be attached to lift arm assembly 14 via a load bearing pivot pin 19.

Tilting of bucket 13 may be controlled by a hydraulic tilt cylinder 20. In one embodiment, bucket 13 may be placed in a fully racked back position by extending tilt cylinder 20. For purposes of this disclosure, a fully racked back position of bucket 13 corresponds to position in which bucket 13 has reached a maximum tilted back position as determined by any mechanical or electronic stop either associated with bucket 13, hydraulic cylinder 15, or provided by another suitable motion limiting device. It should be noted that, in alternative embodiments, bucket 13 may be placed in a fully racked back position by retracting tilt cylinder 20.

Figure 2:
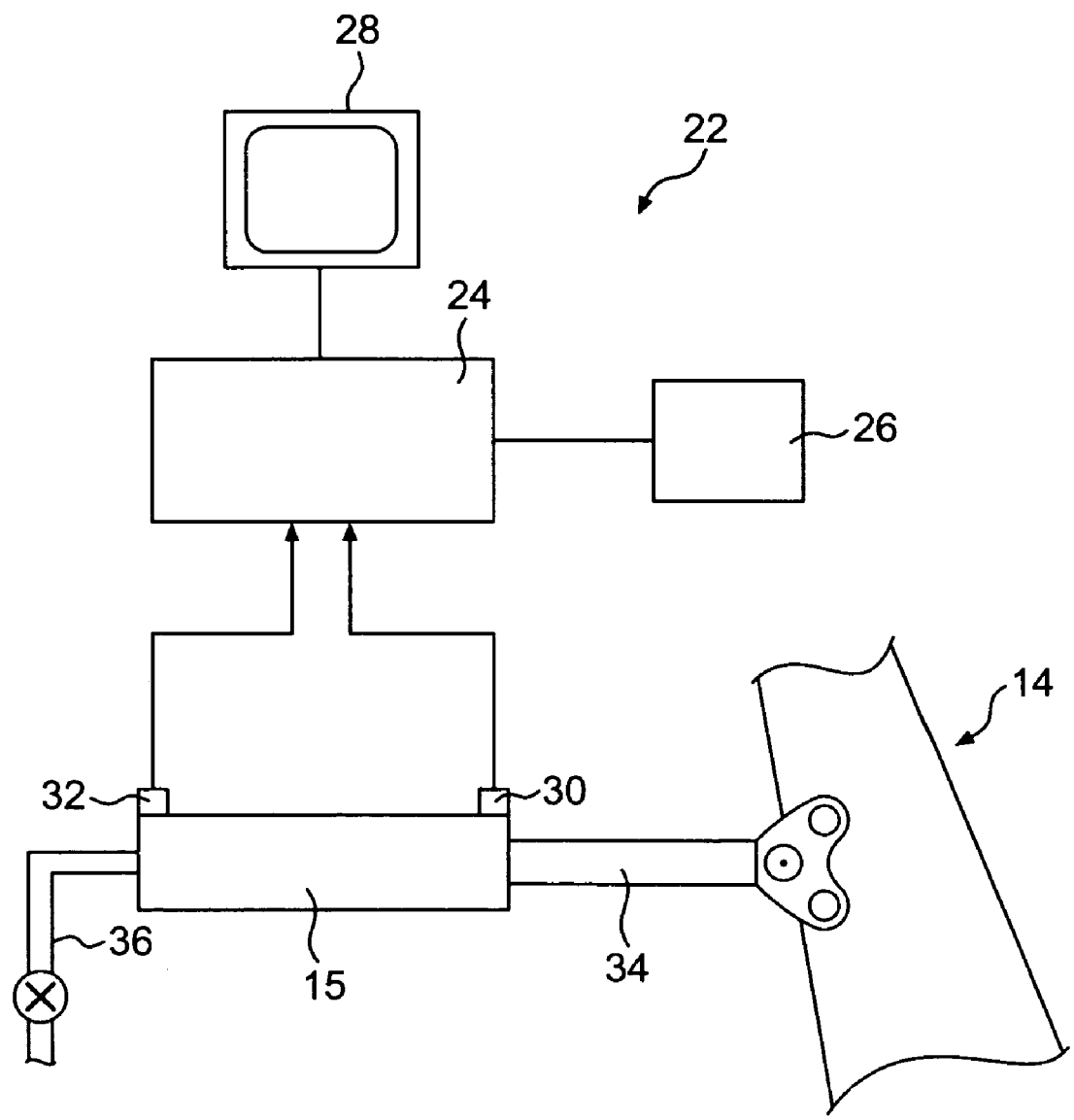
FIG. 2 provides a block diagram representation of a system for validating a payload weight measurement according to an exemplary disclosed embodiment.

FIG. 2 provides a block diagram representation of an exemplary payload validation system 22. System 22 may include a controller 24, a memory 26, and a display 28. System 22 may also include an extension sensor 30 and a pressure sensor 32.

Extension sensor 30 may be configured to sense a characteristic indicative of the extension of lift cylinder 15. In one embodiment, extension sensor 30 may include a position sensor configured to monitor the extension of lift cylinder 15. For example, extension sensor 30 may be configured to provide controller 24 with a signal indicative of the position of a piston 34 with respect to lift cylinder 15.

In an alternate embodiment, extension sensor 30 may include a rotary sensor (not shown) configured to sense rotation of lift arm pivot pin 16 and/or load bearing pivot pin 19. The rotation value supplied by extension sensor 30, along with a known geometry of lift arm assembly 14, may be used to determine the extension of lift cylinder 15.

Pressure sensor 32 may be configured to sense a characteristic indicative of the actuating fluid pressure supplied to lift cylinder 15. Pressure sensor 32 may be positioned at any suitable location with respect to lift cylinder 15 or a hydraulic fluid circuit 36, which supplies actuating fluid to lift cylinder 15. Pressure sensor 32 may be configured to provide a signal to controller 24 indicative of the actuating fluid pressure in lift cylinder 15.

Controller 24 may include any device suitable for running a software application. For example, controller 24 may include a CPU, RAM, one or more memory storage devices, I/O modules, etc. In one embodiment, controller 24 may be integrated with and/or correspond to an electronic control unit (ECU) of work machine 10. Memory 26 may include any type of device for storage of information retrievable by controller 24. For example, memory 26 may include a magnetic storage unit, an optical storage unit, a computer disk, a hard drive, a tape unit, a CD-ROM, a flash memory, or any other suitable device.

Display 28 may include any type of device capable of conveying a graphical message and/or image from controller 24 to an operator of work machine 10. For example, display 28 may include an LCD monitor, a CRT monitor, or any other type of image or text display device. In lieu of display 28, system 22 may also include any other type of device capable of conveying a warning signal or message to an operator of work machine 10. Particularly, system 22 may include an audio device (not shown) for conveying various sounds to the operator. Alternatively, system 22 may include one or more indicator lights (not shown) configured to provide an optical warning message to the operator.

Controller 24 may be configured to automatically determine whether an accurate weight value may be assigned to a payload of work machine 10. Particularly, controller 24 may be configured to monitor the signals provided by pressure sensor 32 and extension sensor 30 to determine a plurality of actuating fluid pressure values and corresponding extension values associated with lift cylinder 15 while lifting a payload of unknown weight with work implement 12. Controller 24 may compare the plurality of actuating fluid pressure values and the corresponding extension values to at least one predetermined pressure versus extension curve generated for lift cylinder 15. Based on this comparison, controller 24 may determine whether a measured weight value for the payload would represent an accurate weight value.

For purposes of this disclosure, the term "curve" is meant to include any functions, data, or information relating two or more quantities. For example, a pressure versus extension curve may include any mathematical function, such as a line or non-linear function, representative of a relationship between pressure and extension values. This function may be stored in memory 26 and/or used by an algorithm to compute corresponding pairs of pressure and extension values. Further, the disclosed "curve" may include any set of data that relates one or more pressure values to one or more extension values. These data may be in the form of a table of values that may be stored as a lookup table in a memory 26, for example.

In operation, system 22 may be calibrated to provide weight measurements for each payload of work implement 12. During this calibration process, a zero weight payload may be lifted by work implement 12. This zero weight payload may correspond to a lift of an empty bucket 13 (i.e., no additional weight is added to work implement 12.) Weight values other than a zero weight payload may also be used. Using the signals generated by pressure sensor 32 and extension sensor 30, controller 24 can construct a first pressure versus extension curve corresponding to the zero weight payload. This pressure versus extension curve may be subjected to a curve fitting process prior to storage, for example, in memory 26. An exemplary curve-fitted pressure versus extension curve for the zero weight payload is represented by curve 40 in FIG. 3.

Also as part of the calibration process, a payload of a known weight may be lifted by work implement 12. While not required, the known weight may be at or near the maximum payload capacity of work implement 12 and/or work machine 10. Other known weight values, however, may be used. Using the signals generated by pressure sensor 32 and extension sensor 30, controller 24 can construct a second pressure versus extension curve corresponding to the known weight payload. Like curve 40, this pressure versus extension curve may be subjected to a curve fitting process prior to storage in memory 26. An exemplary curve-fitted pressure versus extension curve for the known weight payload is represented by curve 42 in FIG. 3.

Controller 24 can use the first and second stored pressure versus extension curves to determine the weight of an unknown payload. Particularly, as work implement 12 lifts or otherwise operates on a payload of unknown weight, controller 24 can monitor the pressure signals output by pressure sensor 32 and the extension signals output by extension sensor 30. These signals may be monitored at all times while work implement 12 is lifting the payload of unknown weight. Alternatively, these signals may be monitored for any selected interval during the payload lift. For example, controller 24 may be configured to monitor the signals from sensors 30 and 32 over a selected time interval or over a selected range of extension values of the hydraulic lift cylinder 15 during the payload lift. In one embodiment, controller 24 may be configured to monitor the signals from sensors 30 and 32 over a interval corresponding to about 50% to about 80% of a maximum extension value of hydraulic lift cylinder 15 or to about 50% to about 80% of a maximum range of motion of work implement 12.

By monitoring the signals output from sensors 30 and 32, controller 24 may construct a third pressure versus extension curve for the payload lift of unknown weight. Curves 44 and 46 represent examples of pressure versus extension curves for payload lifts of unknown weight. The third pressure versus extension curve may be subjected to a curve fitting process, if desired, to remove or minimize the effects of random pressure surges, which may appear as oscillations 48 or other types of variations in curve 44.

The unknown payload weight may be determined by comparing the third pressure versus extension curve (e.g., curve 44) to the first and second pressure versus extension curves 40 and 42. Lift cylinder actuation pressure varies linearly with the weight of a payload at a particular cylinder extension value. Therefore, if curve 44 falls between curves 40 and 42, then the weight of the unknown payload may be calculated using principles of interpolation. Similarly, if curve 44 falls outside of curves 40 and 42, then the weight of the unknown payload may be calculated using principles of extrapolation.

The accuracy of weight value calculations for unknown payload amounts, however, can depend on a number of factors. The path that the center of gravity of a payload travels during a payload lift is one such factor that may affect the accuracy of a payload weight value calculation. Particularly, if there is a discrepancy between the path the center of gravity of a payload travels during the calibration process and the path the center of gravity travels during the lift of the unknown payload weight, then the pressure versus extension data obtained during a lift of the unknown payload weight may not have a similar profile to the curves stored during the calibration process. As a result, interpolation or extrapolation between the calibration curves 40 and 42 and the measured curve (e.g., 44 or 46) may yield inaccurate weight values for the payload of unknown weight.

Factors that may affect the path of the center of gravity may include lifting of the unknown payload with work implement 12 in a different position than was used during the calibration process (e.g., if bucket 13 is not fully racked back during the payload lift or during the calibration process). Lifting a calibration payload or a payload of unknown weight while work machine 10 is pitched forward or backward may also affect the payload weight calculations.

The disclosed payload validation system has the capability to determine whether an accurate weight value can be assigned to a particular payload lift. In one embodiment, controller 24 may be configured to determine a ratio that relates the third pressure versus extension curve (e.g., curve 44 or 46) to the first and second pressure versus extension curves 40 and 42. Specifically, for each extension value along curve 44, for example, or alternatively for any subset of extension values along curve 44, controller 24 may determine a ratio value according to the following expression:

$$R_e = (P_{44e} - P_{40e})/(P_{42e} - P_{40e})$$

where $R_e$ is the ratio value for a particular extension value, $P_{44e}$ is the pressure value of curve 44 (i.e., the measured curve for the unknown weight payload) at the particular extension value, $P_{40e}$ is the pressure value of curve 40 (i.e., the empty payload curve) at the particular extension value, and $P_{42e}$ is the pressure value of curve 42 (i.e., the full payload curve) at the particular extension value. Based on these ratio calculations, controller 24 may generate a ratio versus extension curve corresponding to each measured payload lift.

Figure 4:
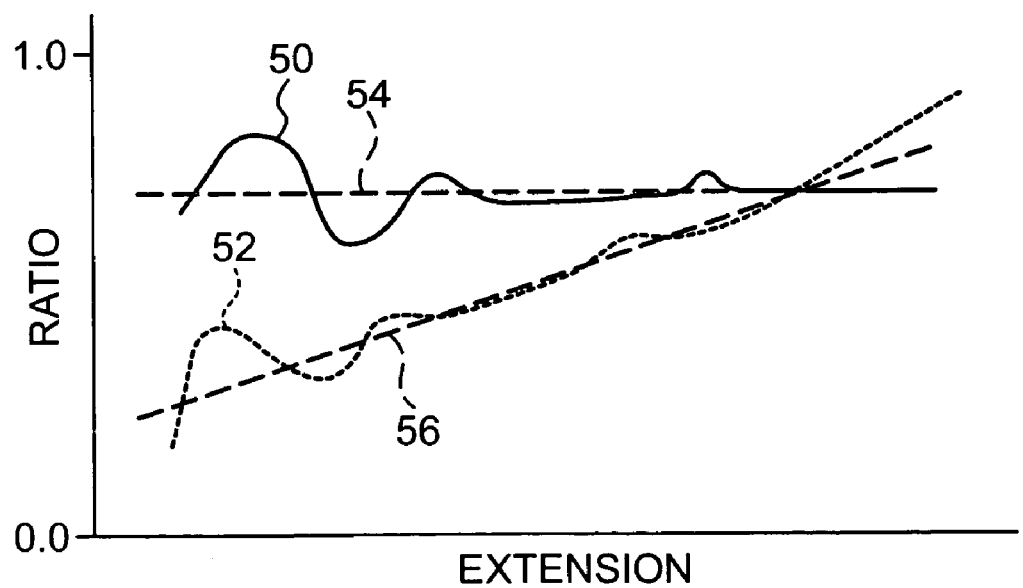
FIG. 4 illustrates a graph plotting exemplary ratio versus extension curves characteristic of a disclosed embodiment.

FIG. 4 illustrates exemplary ratio versus extension curves 50 and 52 that may correspond to measured pressure versus extension curves 44 and 46, respectively. Ratio curves 50 and 52 may be subjected to a curve fitting process to yield curves 54 and 56, respectively.

A weight value for the unknown payload weight may be determined using a ratio versus extension curve such as curve 54, for example. Particularly, for valid payload lifts (i.e., payload lifts for which an accurate weight measurement may be determined), the corresponding ratio versus extension curve generated, especially after curve fitting, may take the form of a line having a nearly zero slope. To get a weight measurement for the unknown payload weight, the value of the curve-fitted ratio versus extension curve (e.g., the y-intercept) may be multiplied by the known weight value used to generate the full payload calibration curve 42, for example. Thus, if the full payload amount lifted during calibration was 16,000 pounds, and the curve-fitted ratio versus extension curve 54 provides a value of 0.75, then the payload lift of unknown weight may be determined as (0.75)(16,000 lb)=12,000 lb.

By observing various characteristics of the ratio versus extension curves, controller 24 can determine whether a particular payload lift qualifies as a valid lift for which an accurate weight measurement may be determined. In one embodiment, controller 24 may be configured to monitor a linearity value of the ratio versus extension curve either in curve-fitted or non-curve-fitted form. Alternatively or additionally, controller 24 may be configured to monitor a slope value of the ratio versus extension curve in curve-fitted or non-curve-fitted form to determine whether an accurate weight value may be assigned to the payload.

Figure 3:
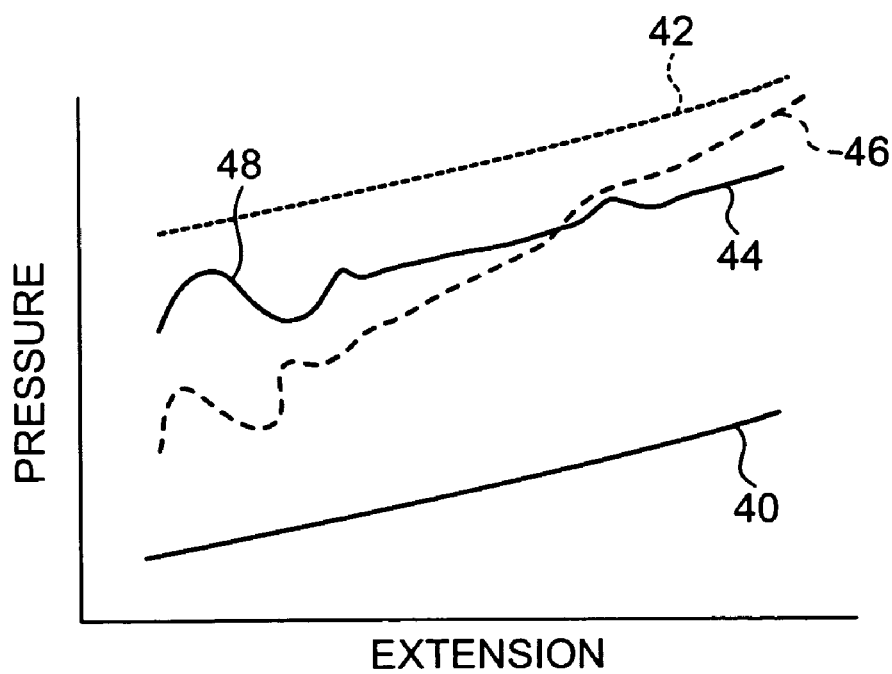
FIG. 3 illustrates a graph plotting exemplary pressure versus extension curves characteristic of a disclosed embodiment.

For example, curve 44 of FIG. 3 may be characteristic of a valid payload lift and may result in ratio versus extension curve 50, as shown in FIG. 4. While curve 50 is illustrated as including effects of random pressure surges, curve-fitted curve 54 is shown with these effects removed. In this example, controller 24 may determine that curve 54 is substantially linear and/or has a slope at or approaching zero and, therefore, may provide an accurate measurement for the payload lift of unknown weight. Thus, controller 24 may designate the payload lift corresponding to curve 44 as a valid payload lift. It should be noted that curve fitting of the ratio versus extension curves may not be necessary in all situations for controller 24 to perform this analysis.

Curve 46 of FIG. 3 may be characteristic of an invalid payload lift and may result in a ratio versus extension curve as shown by curve 52 in FIG. 4. For this example, controller 24 may determine that curve-fitted curve 56 has a non-zero slope. Accordingly, controller 24 may determine that curve 56 may lead to inaccuracies in the weight calculation of the payload lift corresponding to curve 46.

Controller 24 may issue a warning signal to an operator of work machine 10 if a weight calculation for a particular payload is likely to include inaccuracies above a predetermined threshold value and/or an accurate weight value cannot be assigned to the payload. For example, such a warning signal may be issued if the slope of curve 56 deviates from zero by a certain, preselected threshold amount. Warning signals based on other characteristics of the ratio versus extension curves, the pressure versus extension curves, or any other appropriate criteria may also be used.

In one embodiment, controller 24 may be configured to issue a warning signal to an operator of work machine 10 that includes an instruction to ensure that bucket 13 is fully racked back, to repeat the payload lift, and/or to repeat the calibration procedure. These instructions may be conveyed to the operator using display 28, for example. Alternatively, these instructions, or other appropriate warning signals may be conveyed to the operator via one or more audio-based devices or one or more indicator lights.

INDUSTRIAL APPLICABILITY

The disclosed payload validation system may be used along with any type of work machine that handles a payload. The disclosed system may be used to determine the weight of a payload for use in tracking productivity and controlling loading operations. An important feature of the disclosed system is the ability to determine whether a particular payload lift constitutes a valid lift for which an accurate weight value may be determined. With this feature, the disclosed system may partially or fully eliminate inaccurate payload weight calculations caused by an improperly oriented or located work implement, unsuitable calibration procedures, pitched work machines, and other types of errors and/or inconsistencies.

Figure 5:
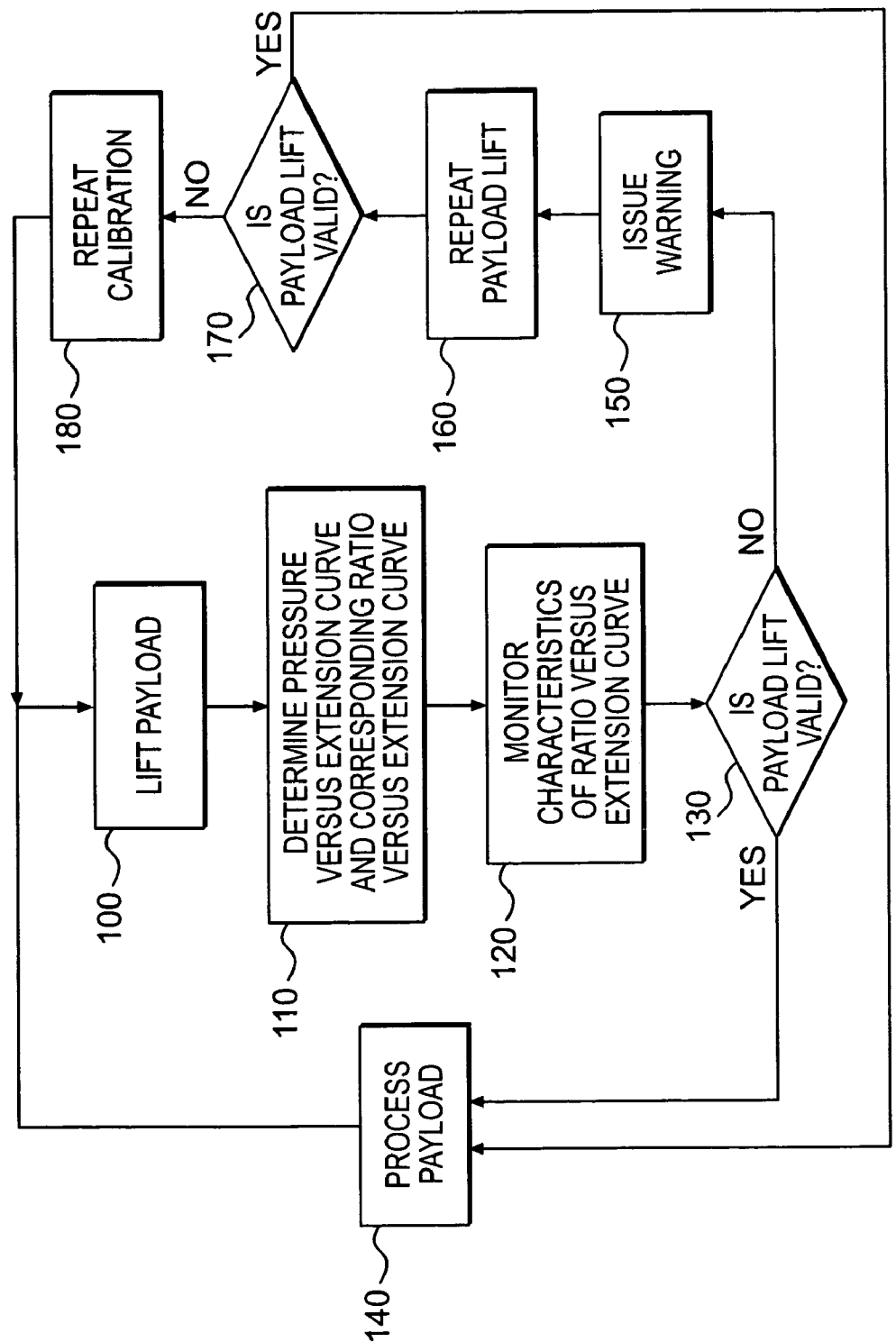
FIG. 5 provides a flow chart diagram of an exemplary disclosed method.

FIG. 5 provides a flow chart diagram of the exemplary disclosed method of validating a payload lift for a machine. At step 100, a payload of unknown weight may be lifted or operated on using work implement 12 associated with work machine 10. At step 110, controller 24 may determine a pressure versus extension curve and a corresponding ratio versus extension curve, based on outputs from pressure sensor 32 and extension sensor 30, that represent at least a portion of the payload lift. At step 120, controller 24 may monitor at least one characteristic associated with the ratio versus extension curve. At step 130, controller 24 may determine whether the payload lift is valid such that an accurate weight value may be assigned to the payload. If the payload lift is valid, then the payload weight may be calculated and processed at step 140. For example, the payload weight may be added to a production tracking quantity associated with work machine 10 or to a total load amount corresponding to a load being placed on a transport machine.

If controller 24 determines that the payload lift is not valid, then a warning signal may be issued at step 150 indicating an invalid payload lift. In response to the warning signal, the payload lift may be repeated at step 160. Prior to repeating the payload lift, an operator of work machine 10 may take steps to ensure that work implement 12 is in a desired orientation. For example, the operator may ensure that bucket 13 is in a fully racked back position. At step 170, controller may determine whether the repeated payload lift is valid. If the repeated payload lift is valid, the payload weight may be calculated and processed at step 140. If the repeated payload lift is invalid, then the another warning signal may be issued. Alternatively or additionally, a calibration process for payload validation system 22 may be repeated at step 180.

It will be apparent to those skilled in the art that various modifications and variations can be made in the disclosed payload lift validation system without departing from the scope of the disclosure. Additionally, other embodiments of the disclosed system will be apparent to those skilled in the art from consideration of the specification. It is intended that the specification and examples be considered as exemplary only, with a true scope of the disclosure being indicated by the following claims and their equivalents.

What is claimed is:

1. A system for validating a payload weight measurement for a machine, comprising:
 a pressure sensor configured to generate a pressure signal indicative of an actuating fluid pressure associated with a fluid cylinder operatively coupled to a work implement of the machine;
 an extension sensor configured to generate an extension signal indicative of an extension of the fluid cylinder; and
 a controller configured to:
   monitor the pressure signal and the extension signal to determine a plurality of actuating fluid pressure values and corresponding extension values associated with the fluid cylinder while lifting a payload of unknown weight with the work implement;
   compare the plurality of actuating fluid pressure values and the corresponding extension values to at least one predetermined pressure versus extension curve;
   determine whether the payload lift qualifies as a valid lift for which an accurate weight value may be assigned to the payload based on the comparison of the plurality of actuating fluid pressure values and the corresponding extension values to the at least one predetermined pressure versus extension curve.

2. The system of claim 1, wherein the at least one predetermined pressure versus extension curve includes:
a first curve corresponding to a payload lift of a zero-weight payload; and
a second curve corresponding to a payload lift of a known weight.

3. The system of claim 2, wherein the plurality of actuating fluid pressure values and corresponding extension values form a third curve representing a lift of the payload of unknown weight, and the controller is configured to:
a) determine a first difference between the third curve and the first curve for a selected extension value;
b) determine a second difference between the second curve and the first curve at the selected extension value
c) determine a ratio between the first difference and second difference at the selected extension value; and
repeat steps a) through c) for at least one other extension value to generate a ratio versus extension curve.

4. The system of claim 3, wherein the controller is configured to monitor a linearity value of the ratio versus extension curve to determine whether an accurate weight value may be assigned to the payload.

5. The system of claim 3, wherein the controller is configured to monitor a slope value of the ratio versus extension curve to determine whether an accurate weight value may be assigned to the payload.

6. The system of claim 1, wherein the controller is configured to issue a warning signal to an operator of the work machine if an accurate weight value cannot be assigned to the payload.

7. The system of claim 6, wherein the warning signal includes an instruction to repeat the lifting of the payload or an instruction to repeat a calibration procedure.

8. The system of claim 1, further including a memory where the at least one predetermined pressure versus extension curve is stored.

9. A work machine, comprising:
a work implement;
at least one fluid cylinder operatively connected to the work implement;
a pressure sensor configured to generate a pressure signal indicative of an actuating fluid pressure associated with the at least one fluid cylinder;
an extension sensor configured to generate an extension signal indicative of an extension of the at least one fluid cylinder; and
controller configured to:
determine a plurality of actuating fluid pressure values and corresponding extension values associated with the at least one fluid cylinder while lifting a payload of unknown weight with the work implement;
compare the plurality of actuating fluid pressure values and the corresponding extension values to at least one predetermined pressure versus extension curve;
determine whether the payload lift qualifies as a valid lift for which an accurate weight value may be assigned to the payload based on the comparison of the plurality of actuating fluid pressure values and the corresponding extension values to the at least one predetermined pressure versus extension curve.

10. The system of claim 9, wherein the at least one predetermined pressure versus extension curve includes:
a first curve corresponding to a payload lift of a zero-weight payload; and
a second curve corresponding to a payload lift of a known weight.

11. The system of claim 10, wherein the plurality of actuating fluid pressure values and corresponding extension values form a third curve representing a lift of the payload of unknown weight, and the controller is configured to:
a) determine a first difference between the third curve and the first curve for a selected extension value;
b) determine a second difference between the second curve and the first curve at the selected extension value;
c) determine a ratio between the first difference and second difference at the selected extension value; and
repeat steps a) through c) for at least one other extension value to generate a ratio versus extension curve.

12. The system of claim 11, wherein the controller is configured to monitor a linearity value of the ratio versus extension curve to determine whether an accurate weight value may be assigned to the payload.

13. The system of claim 11, wherein the controller is configured to monitor a slope value of the ratio versus extension curve to determine whether an accurate weight value may be assigned to the payload.

14. The system of claim 9, wherein the controller is configured to issue a warning signal to an operator of the work machine if an accurate weight value cannot be assigned to the payload.

15. The system of claim 14, wherein the warning signal includes an instruction to repeat the lifting of the payload or an instruction to repeat a calibration procedure.

16. A method of validating a payload lift for a machine, comprising:
lifting a payload of unknown weight using a work implement associated with the machine;
determining a plurality of actuating fluid pressure values and corresponding extension values associated with a fluid cylinder operatively connected to the work implement;
comparing the plurality of actuating fluid pressure values and the corresponding extension values to at least one predetermined pressure versus extension curve;
determining whether the payload lift Qualifies as a valid lift for which an accurate weight value may be assigned to the payload based on the comparison of the plurality of actuating fluid pressure values and the corresponding extension values to the at least one predetermined pressure versus extension curve.

17. The method of claim 16, wherein determining the plurality of actuating fluid pressure values and corresponding extension values is performed over a selected time interval while lifting the payload.

18. The method of claim 16, wherein determining the plurality of actuating fluid pressure values and corresponding extension values is performed over a selected range of extension values of the fluid cylinder while lifting the payload.

19. The method of claim 16, wherein the at least one predetermined pressure versus extension curve includes:
a first curve corresponding to a payload lift of a zero-weight payload; and
a second curve corresponding to a payload lift of a known weight.

20. The method of claim 19, wherein the plurality of actuating fluid pressure values and corresponding extension values form a third curve representing the payload lift of the payload of unknown weight, and the method further includes:

a) determining a first difference between the third curve and the first curve for a selected extension value;
b) determining a second difference between the second curve and the first curve at the selected extension value;
c) determining a ratio between the first difference and second difference at the selected extension value; and
repeating steps a) through c) for at least one other extension value to generate a ratio versus extension curve.

21. The method of claim 20, wherein the determination of whether an accurate weight value may be assigned to the payload is based on a linearity value of the ratio versus extension curve.

22. The method of claim 20, wherein the determination of whether an accurate weight value may be assigned to the payload is based on a slope value of the ratio versus extension curve.

23. The method of claim 16, further including issuing a warning signal to an operator of the work machine if an accurate weight value cannot be assigned to the payload.

24. The method of claim 23, wherein the warning signal includes an instruction to repeat the payload lift or an instruction to repeat a calibration procedure.

25. The method of claim 16, further including performing a calibration procedure prior to lifting the payload for generating the at least one pressure versus extension curve.

26. The method of claim 25, wherein the calibration procedure includes:
lifting the work implement with a zero-weight payload and generating a first pressure versus extension curve corresponding to the lifting of the zero-weight payload; and
lifting the work implement with a payload having a known weight and generating a second pressure versus extension curve corresponding to the lifting of the known weight payload.

27. The method of claim 26, further including storing the first and second pressure versus extension curves in a memory.

28. The method of claim 27, further including subjecting the first and second pressure versus extension curves to a curve fitting process prior to storing in the memory.

* * * * *